J. L. WOODBRIDGE.
ELECTRICAL SYSTEM OF DISTRIBUTION.
APPLICATION FILED JUNE 16, 1911.

1,014,355.

Patented Jan. 9, 1912.

Inventor
Joseph Lester Woodbridge
By
Augustus B. Stoughton
Attorney

Witnesses

UNITED STATES PATENT OFFICE.

JOSEPH LESTER WOODBRIDGE, OF PHILADELPHIA, PENNSYLVANIA.

ELECTRICAL SYSTEM OF DISTRIBUTION.

1,014,355.   Specification of Letters Patent.   Patented Jan. 9, 1912.

Application filed June 16, 1911. Serial No. 633,609.

*To all whom it may concern:*

Be it known that I, JOSEPH LESTER WOODBRIDGE, a citizen of the United States, and a resident of Philadelphia, in the county of Philadelphia, State of Pennsylvania, have invented certain new and useful Improvements in Electrical Systems of Distribution, of which the following is a specification.

My invention relates to systems in which a dynamo driven at variable speed is employed to furnish electric current at substantially constant potential to a consumption circuit, and the invention comprises means for controlling the field current of the dynamo to maintain its potential substantially constant with variations of speed. To accomplish this result I provide a combination of circuits connected in the form of a Wheatstone bridge, this bridge being connected between the opposite conductors of the consumption circuit, while the field winding is connected across opposite junction points of the bridge. The control of the current in the field of the dynamo is obtained by reason of the special characteristics of the circuits constituting the several branches of the bridge.

My invention will be clearly understood by reference to the following description taken in connection with the accompanying drawings, in which—

Figure 1:
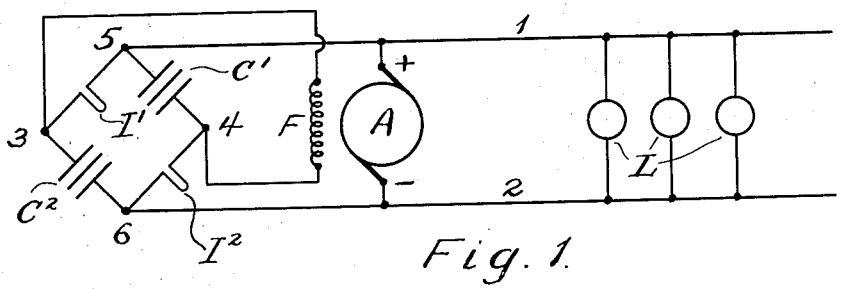
Figure 2:
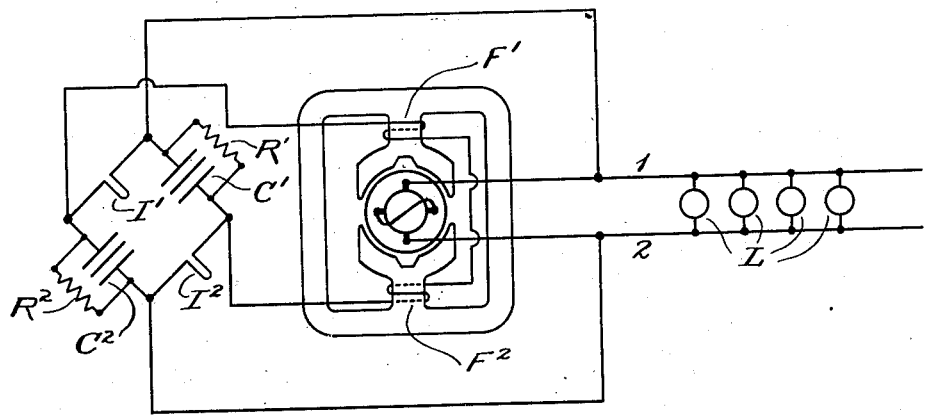

Figure 1 is a diagrammatic representation of a system involving features of the invention, and Fig. 2 is a modification of the system shown in Fig. 1.

Referring to Fig. 1 A is a dynamo connected to the consumption circuit 1—2 which supplies the translating devices L. The dynamo A may be driven by any suitable means at variable speed, as, for example, from the axle of a moving vehicle, such as a railway car, or by the engine of an automobile. F is the field winding of the dynamo which is connected across the opposite junction points 3 and 4 of a Wheatstone bridge, the other two junction points 5 and 6 of this bridge being connected to the consumption circuit 1—2. The bridge comprises four branches, in two of which are shown sources of counter electromotive force $C^1$ and $C^2$. These may be counter electromotive force cells, constructed in the well known manner by immersing sheets of similar metal, such as lead or platinum in an electrolyte, for example dilute sulfuric acid. Such cells oppose the flow of current when electromotive force is applied to their terminals up to a certain value of this electromotive force, but beyond this value current will pass freely through the cells. These cells have no capacity for the storage of electrical energy and when the electromotive force at their terminals is reduced below the critical point they cannot discharge. These cells should be so designed that their critical voltage, that is the aggregate of the critical voltages of all the cells connected in series in each branch, should be equal to one-half of the voltage desired across the circuit 1—2. In the other two opposite branches of the Wheatstone bridge are shown resistances $I^1$ and $I^2$ having a high temperature co-efficient, such as iron wire. These resistances are well known in the art and for this particular use should be so designed as to have the well known constant current characteristic at one-half the voltage desired across the circuit 1—2. Under these conditions slight variations of voltage above or below this value will not cause any appreciable change of current through these resistances.

The operation of the apparatus above described will then be, as follows: When the speed of the dynamo A is too low to maintain full voltage across the circuit 1—2, current will pass from the point 5 of the Wheatstone bridge through resistance $I^1$ to the point 3, thence through the field winding F to the point 4, and thence through resistance $I^2$ to the point 6 in conductor 2. No appreciable current will flow through the cells $C^1$ and $C^2$ since the potential across these cells has not reached the critical value. As the speed of the dynamo increases, the potential across the points 5 and 6 will increase, producing at first an increase of current through the field F. The potential across the circuit 1—2 will thus rise rapidly due to the increase of speed and the increase of field excitation until this potential nearly reaches the desired limiting value for which the apparatus has been designed. At this point the potential difference between point 3 and point 4 of the Wheatstone bridge will be reduced to a small amount just sufficient to produce the field excitation required at this speed of the dynamo A. The entire current to be carried by the resistances $I^1$ and $I^2$ will be passing through the field F, and this field should be so designed that the difference of potential across its terminals when carrying this current will be comparatively small, for example, 5% of the total potential across the circuit 1—2, the potential of the point 3 being positive with respect to point 4. Now assuming that there is a further increase of speed of dynamo A, no greater flow of current can take place through the field F for the reason that the iron wire resistances $I^1$ and $I^2$ have reached their critical condition and maintain their current substantially constant regardless of the impressed voltage. As soon, however, as the potential across the cells $C^1$ and $C^2$ reaches the critical value, a part of the current transmitted through $I^1$ and $I^2$ will flow through these cells thus reducing the amount of current in the field winding F. As the potential across the circuit 1—2 approaches the desired limiting value with increase of speed of dynamo A, the current in the field winding F will gradually be reduced. The potential across the circuit 1—2 can never quite reach the limiting value, that is, a value equal to the sum of the electromotive force of the cells $C^1$ and $C^2$ since when this value is reached the potential across the points 3—4 will be reduced to zero, and the dynamo would have no excitation. It will be seen, therefore, that the potential of the dynamo A will continually approach a certain limiting value as this speed increases, but will never quite reach this value, and will be substantially constant for a wide range of speed.

The use of a Wheatstone bridge with resistances of different temperature of characteristics to produce results similar to those described above has already been proposed, but the use of counter electromotive force cells in two opposite branches of the bridge in combination with resistances of high temperature co-efficient in the other two branches is believed to be new, and constitutes a substantial improvement, since these counter electromotive force cells cause all of the current passing through the resistances $I^1$ and $I^2$ to pass through the field F at a potential below the critical value across the circuit 1—2, whereas with resistances instead of counter electromotive force cells in these two branches, a part of the current carried by the resistances $I^1$ and $I^2$ will be diverted, and only a part will be transmitted through the field F. The introduction of these counter electromotive force cells will, therefore, provide closer voltage regulation, and permit the use of a smaller field winding on the dynamo.

In Fig. 2 I have shown a modification of the system described in connection with Fig. 1. In Fig. 2 the dynamo is of the well known Rosenberg type described in United States Patent No. 954,468. The field windings $F^1$ and $F^2$ which provide the primary excitation for this machine are connected across the Wheatstone bridge just as described in connection with Fig. 1. This Wheatstone bridge is also modified by the addition of resistances $R^1$ and $R^2$ in parallel with the counter electromotive force cells $C^1$ and $C^2$ respectively. These resistances may be useful to permit the iron wire resistances $I^1$ and $I^2$ to be designed of comparatively large current carrying capacity so that they may be made rugged in construction and suitable to withstand mechanical vibration, while the counter electromotive force cells $C^1$ and $C^2$ may be made of smaller current carrying capacity, and, therefore, less expensive. This is particularly important if platinum is used in these cells.

Having described my invention what I claim and desire to secure by Letters Patent is—

1. In combination, a consumption circuit, a variable speed dynamo connected thereto, a Wheatstone bridge whereof two opposite branches contain counter electromotive force cells, while the other two opposite branches contain resistances of high temperature co-efficient, connections from two opposite junction points of the bridge to the consumption circuit and a field winding for the dynamo connected to the other two opposite junction points.

2. In combination, a consumption circuit, a variable speed dynamo connected thereto, two branch circuits connected in parallel across the consumption circuit, whereof one contains a source of counter electromotive force and a high temperature co-efficient resistance in series, and a field winding for the dynamo connected at one end to a point in the branch circuit between the counter electromotive force cell and the said resistance, and at the other end to an intermediate point in the other branch circuit.

3. The combination of a variable speed dynamo-electric machine having a field winding, with a circuit connected across the machine terminals containing a counter electromotive force cell and a resistance of high temperature co-efficient, and connection from the field winding to a point in said circuit between the cell and the resistance.

4. In a system of electrical distribution comprising a consumption circuit and its source, the combination of a Wheatstone bridge connected across the consumption circuit and containing respectively counter electromotive force cells and high temperature co-efficient resistances in alternate branches, and a field winding for controlling the voltage of the source connected across opposite junction points of the bridge, substantially as described.

5. In a system of electrical distribution comprising a consumption circuit and its source, the combination of a Wheatstone bridge connected across the consumption circuit and containing respectively counter electromotive force cells and high temperature co-efficient resistances in alternate branches, a field winding for controlling the voltage of the source connected across opposite junction points of the bridge, and resistances connected in parallel with the counter electromotive force cells.

In testimony whereof I have signed my name.

JOSEPH LESTER WOODBRIDGE.

Witnesses:
J. H. TRACY,
F. G. BEETEM.